US011474884B2

(12) United States Patent
Tameshige et al.

(10) Patent No.: US 11,474,884 B2
(45) Date of Patent: Oct. 18, 2022

(54) EVENT MONITORING APPARATUS AND EVENT MONITORING METHOD

(71) Applicant: HITACHI, LTD., Tokyo (JP)

(72) Inventors: Takashi Tameshige, Tokyo (JP); Yasuyuki Tamai, Tokyo (JP); Mineyoshi Masuda, Tokyo (JP); Yosuke Himura, Tokyo (JP); Kouichi Murayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/192,281

(22) Filed: Mar. 4, 2021

(65) Prior Publication Data
US 2022/0066842 A1 Mar. 3, 2022

(30) Foreign Application Priority Data

Aug. 28, 2020 (JP) .............................. JP2020-144975

(51) Int. Cl.
G06F 9/54 (2006.01)
G06F 11/30 (2006.01)
(52) U.S. Cl.
CPC .......... G06F 9/542 (2013.01); G06F 11/3072 (2013.01)
(58) Field of Classification Search
CPC .............................. G06F 9/542; G06F 11/3072
See application file for complete search history.

(56) References Cited

U.S. PATENT DOCUMENTS

| 2013/0218765 A1* | 8/2013 | Hammad | G06Q 20/326 705/41 |
| 2016/0378576 A1* | 12/2016 | Jayakumar | G06F 9/542 719/318 |
| 2017/0053460 A1* | 2/2017 | Hauser | G07C 5/04 |
| 2018/0102938 A1* | 4/2018 | Yoon | G06F 16/358 |
| 2019/0026685 A1* | 1/2019 | Chappell | G06Q 30/0282 |
| 2019/0166162 A1* | 5/2019 | Anand | H04L 67/10 |
| 2020/0012543 A1* | 1/2020 | Masuda | G06F 11/079 |
| 2020/0034358 A1* | 1/2020 | Wurzel | G06F 16/245 |
| 2020/0310996 A1* | 10/2020 | Twohig | G06F 9/542 |

FOREIGN PATENT DOCUMENTS

JP 2011-198176 A 10/2011

* cited by examiner

Primary Examiner — Tuan C Dao
(74) Attorney, Agent, or Firm — Volpe Koenig

(57) ABSTRACT

Provided are an event monitoring apparatus and an event monitoring method that make it possible to set a proper threshold without handling monitoring target systems on an individual basis.

There are included: a threshold determination program calculating degree of similarity between a ledger guide message and an event message, regarding a maximum value of the calculated degree of similarity as a first threshold, and setting a second threshold that is greater than the first threshold by a predetermined value; a ledger allocation program associating a ledger guide message having the degree of similarity intermediate between the first threshold and the second threshold with the event message; and a threshold evaluation program reporting the degree of similarity to a manager of a monitoring target system when the degree of similarity is higher than the first threshold.

11 Claims, 17 Drawing Sheets

FIG. 7

| PHENO-MENON ID | OCCURRENCE DATE AND TIME | HASH VALUE | EVENT ID | MESSAGE BODY | ALLOCATED LEDGER ID | TOTAL NUMBER OF EVENT WORD SEQUENCES (1 TO 3-gram) |
|---|---|---|---|---|---|---|
| 1 | 2018.01.28 T10:02:13 | Hash 01 | event ID 01 | 2018.01.28.T.10:02:13 backup process func A_Func B is starting. Hitachi Ltd Reseach and Development Group. | BookID01 | 60 |
| 2 | 2018.01.28 T10:03:41 | Hash 02 | event ID 02 | eventID 02 app A is starting. Digital Technology Center. | BookID02 | 24 |
| 3 | 2018.01.28 T10:10:10 | Hash 03 | event ID 03 | Digital Technology Center. eventID 03 app A has been finished. | BookID03 | 27 |
| ... | ... | ... | ... | ... | ... | ... |
| n | 2018.01.28 T19:04:32 | Hash n | event ID n | 2018.01.28.T.19:04:32 All backup processes Dept have been completed. Service Computing. | BookID N | 45 |
| ... | ... | ... | ... | ... | ... | ... |
| m | 2018.01.29 T10:04:28 | Hash m | envet ID m | 2018.01.29.T.10:04:28 backup process func A_Func C is starting. Reseach and Development Group. | BookID M | 60 |
| ... | ... | ... | ... | ... | ... | ... |
| l | 2018.01.29 T10:05:49 | Hash l | envet ID l | 2018.01.29.T.10:05:49 backup process func A_Func B is starting. Hitachi Ltd Reseach and Development Group. | BookID 01 | 60 |
| ... | ... | ... | ... | ... | ... | ... |

FIG. 8

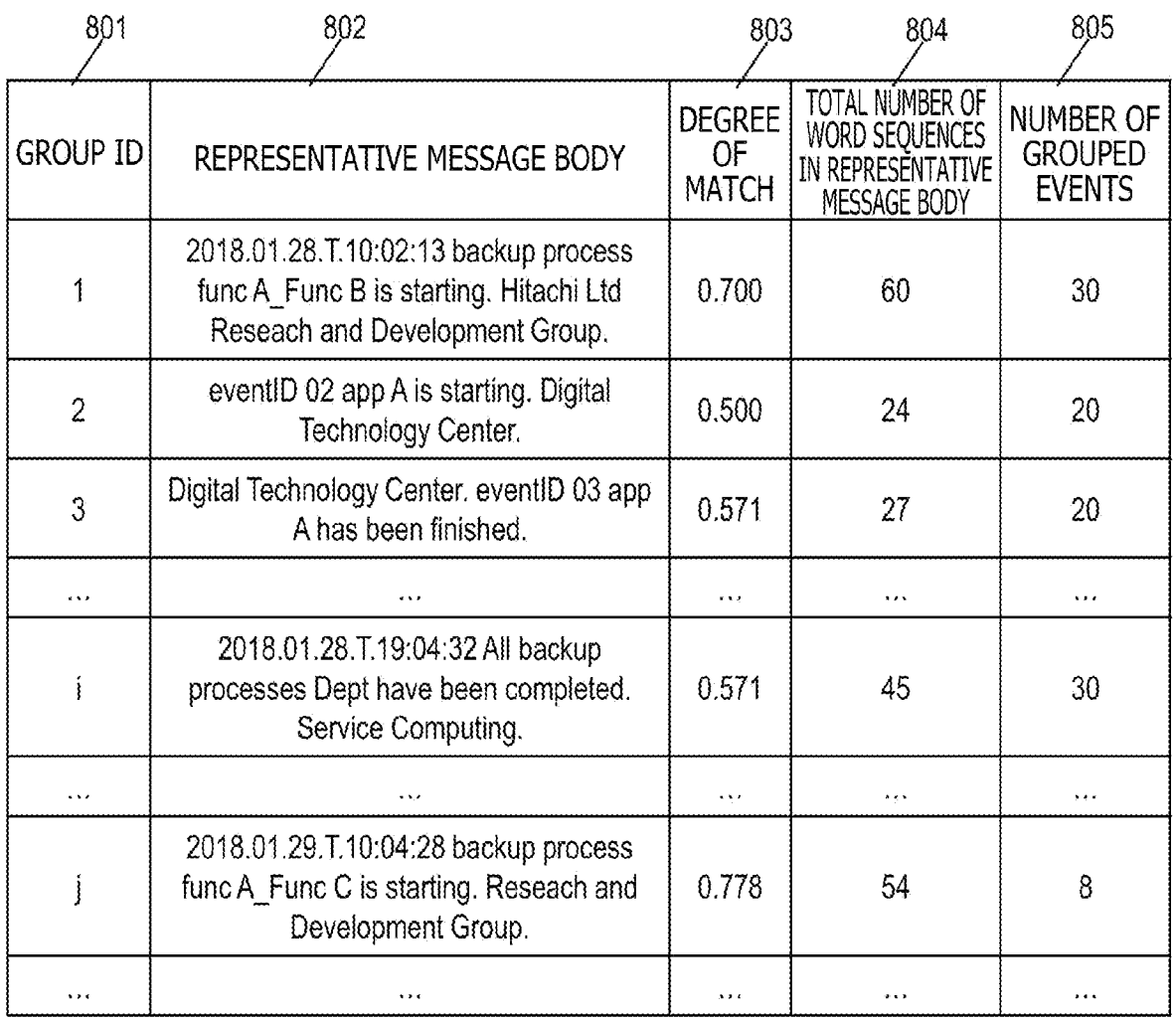

| GROUP ID | REPRESENTATIVE MESSAGE BODY | DEGREE OF MATCH | TOTAL NUMBER OF WORD SEQUENCES IN REPRESENTATIVE MESSAGE BODY | NUMBER OF GROUPED EVENTS |
|---|---|---|---|---|
| 1 | 2018.01.28.T.10:02:13 backup process func A_Func B is starting. Hitachi Ltd Reseach and Development Group. | 0.700 | 60 | 30 |
| 2 | eventID 02 app A is starting. Digital Technology Center. | 0.500 | 24 | 20 |
| 3 | Digital Technology Center. eventID 03 app A has been finished. | 0.571 | 27 | 20 |
| ... | ... | ... | ... | ... |
| i | 2018.01.28.T.19:04:32 All backup processes Dept have been completed. Service Computing. | 0.571 | 45 | 30 |
| ... | ... | ... | ... | ... |
| j | 2018.01.29.T.10:04:28 backup process func A_Func C is starting. Reseach and Development Group. | 0.778 | 54 | 8 |
| ... | ... | ... | ... | ... |

| LEDGER ID 901 | DESIGNATED OCCURRENCE DATE AND TIME 902 | LEDGER MESSAGE BODY 903 | PROCESS PERFORMED UPON ARRIVAL 904 | NUMBER OF TIMES PER UNIT PERIOD 905 |
|---|---|---|---|---|
| Book ID01 | everyday 10:00-11:00 | backup process func A_Func B is starting. XXX YYYY ZZ | CONTINUATION OF MONITORING | 30 TIMES/ MONTH |
| Book ID02 | weekday 10:00-11:00 | app A is starting. XXXX YY ZZZ | CONTINUATION OF MONITORING | 20 TIMES/ MONTH |
| Book ID03 | weekday 18:00-18:15 | XXXX YY ZZZ app A has been finished. | EXECUTION OF SHELL SCRIPT aaa | 20 TIMES/ MONTH |
| ... | ... | ... | ... | ... |
| Book ID N | everyday 17:00-20:00 | All backup processes XX have been completed. YYYYY | EXECUTION OF SHELL SCRIPT zzz | 30 TIMES/ MONTH |
| ... | ... | ... | ... | ... |
| Book ID M | weekend 17:00-20:00 | backup process func A_Func C is starting. YYYY ZZZZ | CONTINUATION OF MONITORING | 8 TIMES/ MONTH |
| ... | ... | ... | ... | ... |

| MANAGE-MENT ID (1001) | PHENO-MENON ID (1002) | EVENT ||||||| LEDGER ||||||
|---|---|---|---|---|---|---|---|---|---|---|---|---|---|---|
| | | MESSAGE BODY (1003) | TOTAL NUMBER OF WORD SEQUENCES (1004) | MATCHED (FOUND IN EVENT AND LEDGER) (1005) || UNMATCHED/INSUFFICIENT (FOUND IN EVENT AND NOT FOUND IN LEDGER) (1006 1007) || LEDGER ID (1008) | MESSAGE BODY (1009 1010) | TOTAL NUMBER OF WORD SEQUENCES (1011) | MATCHED (1012 1013) || UNMATCHED/INSUFFICIENT (FOUND IN EVENT AND NOT FOUND IN LEDGER) (1014 1015) ||
| | | | | RATE | COUNT | RATE | COUNT | | | | RATE | COUNT | RATE | COUNT |
| 1 | 1 | 2018.01.28.T.10:02:13 backup processfunc A_Func B is starting. Hitachi Ltd Research and Development Group. | 60 | 0.350 | 21 | 0.650 | 39 | Book ID 01 | backup process func A_Func B is starting. XXX YYYY ZZ | 30 | 0.700 | 21 | 0.300 | 9 |
| 2 | 1 | 2018.01.28.T.10:02:13 backup processfunc A_Func C is starting. Hitachi Ltd Research and Development Group. | 60 | 0.250 | 15 | 0.750 | 45 | Book ID M | backup process func A_Func C is starting. YYYY ZZZZ | 27 | 0.556 | 15 | 0.444 | 12 |
| 3 | 1 | 2018.01.28.T.10:02:13 backup processfunc A_Func B is starting. Hitachi Ltd Research and Development Group. | 60 | 0.067 | 4 | 0.933 | 56 | Book ID 02 | app A YY ZZZ app A is starting. YY ZZZ | 18 | 0.222 | 4 | 0.778 | 14 |
| 4 | 1 | 2018.01.28.T.10:02:13 backup processfunc A_Func B is starting. Hitachi Ltd Research and Development Group. | 60 | 0.017 | 1 | 0.983 | 59 | Book ID 03 | XXXX YY ZZZ app A has been finished | 21 | 0.048 | 1 | 0.952 | 20 |
| 5 | 1 | 2018.01.28.T.10:02:13 backup processfunc A_Func B is starting. Hitachi Ltd Research and Development Group. | 60 | 0.017 | 1 | 0.983 | 59 | Book ID N | All backup processes XX have been completed. YYYYY | 21 | 0.048 | 1 | 0.952 | 20 |
| ... | ... | ... | ... | ... | ... | ... | ... | ... | ... | ... | ... | ... | ... | ... |
| 1 | 3 | eventID GG app A is starting. Digital Technology Center. | 24 | 0.375 | 9 | 0.625 | 15 | Book ID 02 | app A is starting. XXXX YY ZZZ | 18 | 0.500 | 9 | 0.500 | 9 |
| ... | ... | ... | ... | ... | ... | ... | ... | ... | ... | ... | ... | ... | ... | ... |

| LEDGER ID | MESSAGE BODY | LEDGER | | | | | | REPRESENTATIVE EVENT | | | | | |
|---|---|---|---|---|---|---|---|---|---|---|---|---|---|
| | | TOTAL NUMBER OF WORD SEQUENCES | MATCHED | | UNMATCHED/ INSUFFICIENT (UNMATCHED TO LEDGER) | | | TOTAL NUMBER OF WORD SEQUENCES | MATCHED | | UNMATCHED/INSUFFICIENT (FOUND IN REPRESENTATIVE EVENT AND NOT FOUND IN LEDGER) | |
| | | | RATE | COUNT | RATE | COUNT | | | RATE | COUNT | RATE | COUNT |
| Book ID 01 | backup process func A_Func B is starting. XXX YYYY ZZ | 30 | 0.700 | 21 | 0.300 | 9 | | 60 | 0.350 | 21 | 0.650 | 39 |
| Book ID 02 | app A is starting. XXXX YY ZZZ | 18 | 0.500 | 9 | 0.500 | 9 | | 24 | 0.375 | 9 | 0.625 | 15 |
| Book ID 03 | XXXX YY ZZZ app A has been finished. | 21 | 0.571 | 12 | 0.429 | 9 | | 27 | 0.444 | 12 | 0.556 | 15 |
| ⋮ | ⋮ | ⋮ | ⋮ | ⋮ | ⋮ | ⋮ | | ⋮ | ⋮ | ⋮ | ⋮ | ⋮ |
| Book ID N | All backup processes XX have been completed. YYYYY | 21 | 0.571 | 12 | 0.429 | 9 | | 45 | 0.267 | 12 | 0.733 | 33 |
| ⋮ | ⋮ | ⋮ | ⋮ | ⋮ | ⋮ | ⋮ | | ⋮ | ⋮ | ⋮ | ⋮ | ⋮ |
| Book ID M | backup process func A_Func C is starting. YYYY ZZZZ | 27 | 0.778 | 21 | 0.222 | 6 | | 54 | 0.389 | 21 | 0.611 | 33 |
| ⋮ | ⋮ | ⋮ | ⋮ | ⋮ | ⋮ | ⋮ | | ⋮ | ⋮ | ⋮ | ⋮ | ⋮ |

| LEDGER ID | MESSAGE BODY | NUMBER OF TIMES PER UNIT PERIOD | PAST EVENT REPRESENTATIVE MESSAGE BODY | NUMBER OF GROUPED EVENTS | GROUP ID | THRESHOLD | THRESHOLD UPPER LIMIT | THRESHOLD LOWER LIMIT | RUNNER-UP THRESHOLD UPPER LIMIT | TOTAL NUMBER OF LEDGER WORD SEQUENCES (1 TO 3-gram) | ALLOCATED PHENOMENON ID |
|---|---|---|---|---|---|---|---|---|---|---|---|
| Book ID 01 | backup process func A_Func B is starting. XXX YYYY ZZ | 30 TIMES/ MONTH | 2018.01.28.T.10:02:13 backup process func A_Func B is starting. Hitachi Ltd Reseach and Development Group. | 30 | 1 | 0.700 | 0.733 | 0.667 | 0.533 | 30 | 1,1 |
| Book ID 02 | app A is starting. XXXX YY ZZZ | 20 TIMES/ MONTH | eventID 02 app A is starting. Digital Technology Center. | 20 | 2 | 0.500 | 0.556 | 0.444 | 0.278 | 18 | 2 |
| Book ID 03 | XXXX YY ZZZZ app A has been finished. | 20 TIMES/ MONTH | Digital Technology Center. eventID 03 app A has been finished. | 20 | 3 | 0.571 | 0.619 | 0.524 | 0.190 | 21 | 3 |
| ... | ... | ... | ... | ... | ... | ... | ... | ... | ... | ... | ... |
| Book ID N | All backup processes XX have been completed. YYYYY | 30 TIMES/ MONTH | 2018.01.28.T.19:04:32 All backup processes Dept have been completed. Service Computing. | 30 | 1 | 0.571 | 0.619 | 0.524 | 0.10 | 21 | n |
| ... | ... | ... | ... | ... | ... | ... | ... | ... | ... | ... | ... |
| Book ID M | backup process func A_Func C is starting. YYYY ZZZZ | 8 TIMES/ MONTH | 2018.01.29.T.10:04:28 backup process func A_Func C is starting. Research and Development Group. | 8 | j | 0.778 | 0.815 | 0.741 | 0.733 | 27 | m |
| ... | ... | ... | ... | ... | ... | ... | ... | ... | ... | ... | ... |

FIG. 17

EVENT LIST SCREEN

RESULT OF LEARNING PHASE REGARDING NEW EVENTS ARE SHOWN

| PHENOMENON ID 1701 | EVENT ID 1702 | ALLOCATION 1703 | UNKNOWN 1704 | OCCURRENCE DATE AND TIME 1705 | ALLOCATED LEDGER 1706 | 1707 |
|---|---|---|---|---|---|---|
| 1 | eventID1 | DONE | --- | 2020/1/28 12:30:44.111 | bookID1 | ... |
| 2 | eventID2 | UNDONE | --- | 2020/1/28 12:32:12.345 | --- | ... |
| 3 | eventID3 | DONE | THRESHOLD EXCEEDED BY DEGREE OF MATCH | 2020/1/28 12:32:25.667 | bookID n | ... |
| ... | ... | ... | ... | ... | ... | ... |

DO YOU WANT TO PERFORM RELEARNING?

[Yes] [No]

EVENT MONITORING APPARATUS AND EVENT MONITORING METHOD

BACKGROUND OF THE INVENTION

1. Field of the Invention

The present invention relates to an event monitoring apparatus and an event monitoring method.

2. Description of the Related Art

An event monitoring job is one of the operating jobs of an information system (information technology (IT) system). An important IT system used, for example, for core jobs in a company is configured so as to issue an event when a malfunction, an abnormality, or other similar phenomenon occurs.

An event is data that is issued from a program referred to as an agent. The agent is implemented in an IT system. The agent regards component elements of the IT system, such as hardware or an operating system (OS), middleware, or other software, as a monitoring target, observes the state of the monitoring target, such as performance and life and death of the monitoring target, and acquires log data outputted from the monitoring target. When specific conditions are met by the observed state or the acquired log data, the agent issues an event indicating the occurrence of a phenomenon corresponding to the specific conditions. The event is Wdata for reporting an encountered phenomenon to a person. Therefore, the event includes human-legible character string data that indicates, for example, the encountered phenomenon, the location where the encountered phenomenon has occurred, and the monitoring target associated with the encountered phenomenon. The character string data is referred to as an event message. The event issued from the agent is sent to a management computing device.

The management computing device accumulates events received from each agent, and manages the accumulated events in an integrated fashion. Further, the management computing device allows a monitoring operator (human) to monitor the events received from each agent. By confirming that the received events substantially match ledger guide messages stored in a ledger management table, the monitoring operator verifies that the IT system, which is a monitoring target system, is operating normally.

Work performed by the monitoring operator is described below. When a new event reaches the management computing device, the monitoring operator first searches a ledger management section for a ledger guide message that substantially matches the new event. More specifically, the monitoring operator, for example, visually checks documents or searches the documents to find (allocate) a ledger guide message that is similar to the contents of the event message included in the new event. Then, by allocating the ledger guide message corresponding to the event message, the monitoring operator monitors the normal operation of the IT system.

The event monitoring job includes the above-described series of jobs related to event monitoring. Performing the event monitoring job continuously in a proper manner makes it possible to constantly detect the normal operation of the IT system. Stated differently, it is necessary for the monitoring operator to do the event monitoring job at all times while the IT system is operating. Therefore, personnel expenses required for the event monitoring job are extremely high.

Particularly, huge cost is required for work performed by the monitoring operator who searches for the ledger guide message corresponding to the event message. Work to be performed for ledger guide message allocation takes time and effort. The reason is that the ledger guide message and the event message are often specific to the IT system. Therefore, although the accuracy of allocation can be increased by applying, for example, a regular expression to the ledger guide message, such work also varies on an individual basis. Consequently, the work to be performed for ledger guide message allocation took time and effort previously even if the event monitoring job could be executed with the aid of a computer.

Disclosed under the above circumstances is a technology that, even in a case where an equipment name does not perfectly match a corresponding equipment name in a plant monitoring control system, makes it possible to conduct a search by using a morphologically analyzed equipment name and score when the event monitoring job is executed with the aid of a computer. As a result, this technology is able to easily and promptly establish an event monitoring job (refer to JP-2011-198176-A).

SUMMARY OF THE INVENTION

However, the technology disclosed in JP-2011-198176-A uniquely sets a threshold for narrowing down monitoring target equipment, and does not adequately handle individual IT systems targeted for monitoring.

The present invention has been made in view of the above circumstances. An object of the present invention is to provide an event monitoring apparatus and an event monitoring method that make it possible to set a proper threshold without handling monitoring target systems on an individual basis.

In order to address the above-described problem, according to an aspect of the present invention, there is provided an event monitoring apparatus that monitors an event including an event message indicated by a character string related to a phenomenon encountered in an information system. The event monitoring apparatus includes a ledger management section, a threshold determination section, a ledger allocation section, and a threshold evaluation section. The ledger management section stores a plurality of pieces of ledger data that includes a typical ledger guide message indicated by a character string and describes a method of handling an event. The threshold determination section calculates the degree of similarity between the ledger guide message and the event message, regards a maximum value of the calculated degree of similarity as a first threshold, and sets a second threshold that is greater than the first threshold by a predetermined value. The ledger allocation section associates the ledger guide message having the degree of similarity intermediate between the first threshold and the second threshold with the event message. The threshold evaluation section reports the degree of similarity to a manager of the information system when the degree of similarity is higher than the first threshold.

The present invention makes it possible to implement an event monitoring apparatus and an event monitoring method that are able to properly set a threshold without handling monitoring target systems on an individual basis.

BRIEF DESCRIPTION OF THE DRAWINGS

FIG. 7 is a diagram illustrating an example of an event management table of the event monitoring apparatus according to an embodiment of the present invention;

FIG. 8 is a diagram illustrating an example of a past event group management table of the event monitoring apparatus according to an embodiment of the present invention;

FIG. 9 is a diagram illustrating an example of a ledger management table of the event monitoring apparatus according to an embodiment of the present invention;

FIG. 10 is a diagram illustrating an example of a table that manages the degree of match between events and ledgers of the event monitoring apparatus according to an embodiment of the present invention;

FIG. 11 is a diagram illustrating an example of a table that manages the ledgers and past representative events of the event monitoring apparatus according to an embodiment of the present invention;

FIG. 12 is a diagram illustrating an example of a ledger-specific threshold management table of the event monitoring apparatus according to an embodiment of the present invention;

FIG. 17 is a diagram illustrating an example of a screen that is displayed, for example, on an operator terminal of the event monitoring system according to an embodiment of the present invention.

DESCRIPTION OF THE PREFERRED EMBODIMENTS

Figure 1:
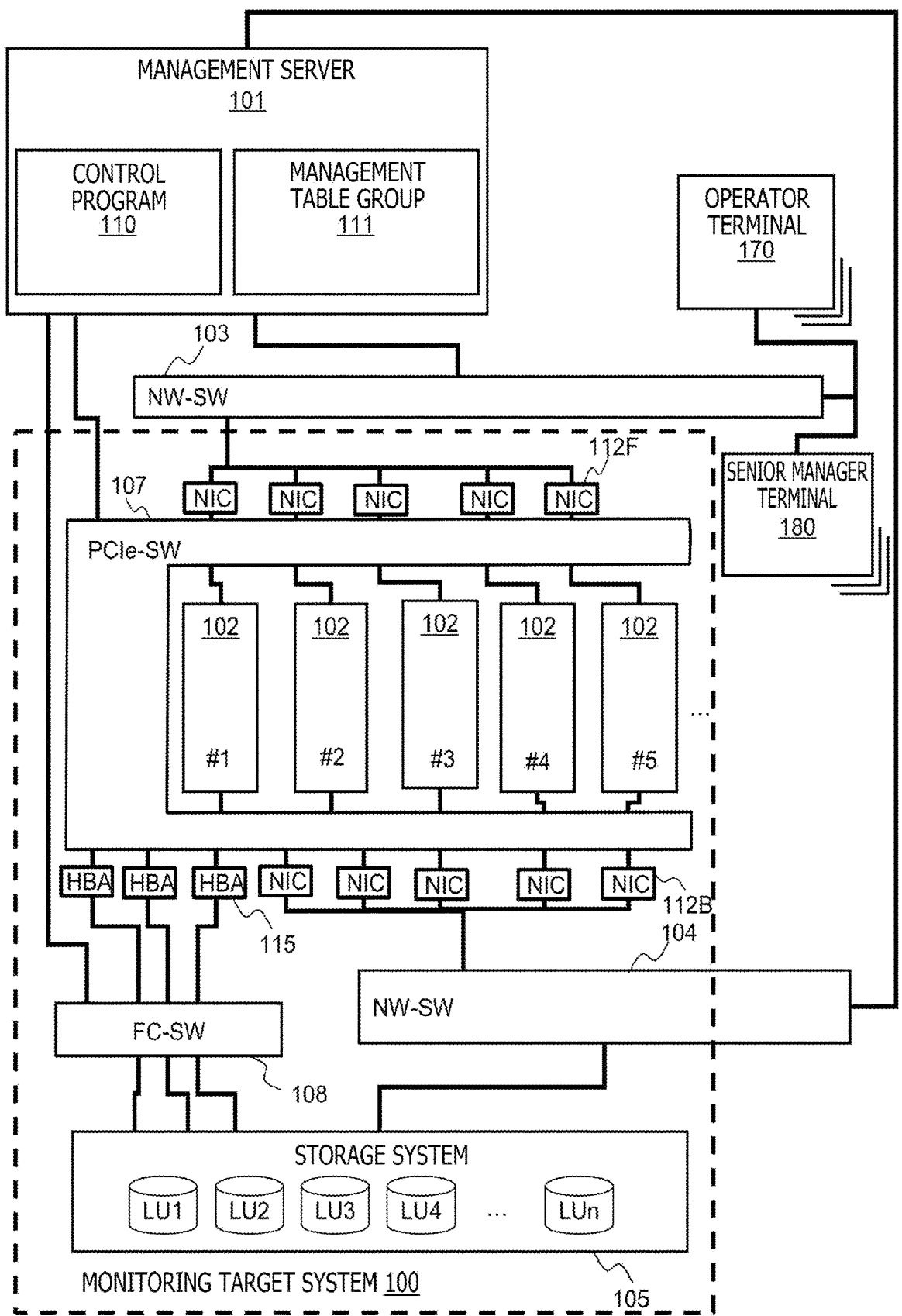
FIG. 1 is a diagram illustrating an example of a hardware configuration of an event monitoring system according to an embodiment of the present invention.

Embodiments of the present invention will now be described with reference to the accompanying drawings. It should be noted that the embodiments described below do not limit the present invention defined by the scope of the appended claims, and that all component elements and their combinations described below in conjunction with the embodiments are not always essential to solutions provided by the present invention.

In the following description, a "memory" represents one or more memories and may typically be a main storage device. At least one memory in a memory section may be a volatile memory or a nonvolatile memory.

A "processor" in the following description is one or more processors. At least one processor is typically a microprocessor such as a central processing unit (CPU), but may alternatively be a processor of a different kind such as a graphics processing unit (GPU). At least one processor may be a single-core processor or a multi-core processor.

Further, at least one processor may be a processor in a broad sense, such as a hardware circuit that performs some or all of processes (e.g., a field-programmable gate array (FPGA) or an application-specific integrated circuit (ASIC)).

In the description of the present disclosure, a storage apparatus (device) includes one storage drive, such as a hard disk drive (HDD) or a solid-state drive (SSD), a redundant array of independent disks device (RAID device) including a plurality of storage drives, and a plurality of RAID devices. Further, in a case where a hard disk drive is adopted, the storage apparatus (device) may include a serial-attached SCSI (SAS) hard disk drive or a near-line SAS (NS-SAS) hard disk drive.

Further, the following description occasionally uses the expression "xxx table" to describe information that is outputted in response to an input. However, the information may be data having any structure or a learning model such as a neural network that generates an output in response to an input. Therefore, the "xxx table" may be referred to as "xxx information."

Furthermore, in the following description, a configuration of each table is merely an example. One table may be divided into two or more tables, or all or some of two or more tables may form one table.

Moreover, the following description occasionally deals with a process by using a "program" as a subject. However, when executed by a processor, the program performs a predetermined process while appropriately using a storage resource (e.g., a memory) and/or a communication interface device (e.g., a port). Therefore, the program may be regarded as the subject of a process. A process described with the program regarded as the subject may be a process performed by a processor or a computing device having the processor.

Programs may be installed on an apparatus such as a computing device, or recorded, for example, on a recording medium (e.g., a non-transitory recording medium) that can be read by a program distribution server or a computing device. Further, in the following description, two or more programs may be implemented as one program, and one program may be implemented as two or more programs.

It should be noted that portions having the same functions are designated by the same symbols in the drawings depicting the embodiments and will not be redundantly described.

Furthermore, in a case where the following description deals with like component elements without distinguishing them from each other, reference numerals (or common portions of the reference numerals) are occasionally used. Meanwhile, in a case where the following description deals with like component elements while distinguishing them from each other, their identification numbers (or reference numerals) are occasionally used.

In some cases, for ease of understanding of the present invention, for example, the position, size, shape, and range of each component element depicted in the drawings do not represent the actual position, size, shape, and range. Accordingly, the embodiments of the present invention are not necessarily limited, for example, to the positions, sizes, shapes, and ranges disclosed in the drawings.

FIG. 1 is a diagram illustrating an example of a hardware configuration of an event monitoring system to which an event monitoring apparatus according to an embodiment of the present invention is applied.

Referring to FIG. 1, the event monitoring system to which the event monitoring apparatus according to the embodiment is applied roughly includes a management system targeted for monitoring (hereinafter referred to as the monitoring target system) 100, a management server 101 for monitoring the monitoring target system 100, an operator terminal 170, and a senior manager terminal 180. The monitoring target system 100, the management server 101, the operator terminal 170, and the senior manager terminal 180 are able to communicate with each other through a network switch 103. Here, the monitoring target system 100 is configured as an information system, and the management server 101 is configured as the event monitoring apparatus.

The monitoring target system 100 includes a server 102. Mainly, an Event Message related to a phenomenon occurring in the server 102 is reported to the management server 101. Although a plurality of servers (five servers) 102 are included in the monitoring target system 100 depicted in FIG. 1, the number of servers 102 is not specifically limited.

The server 102 is connected to a storage system 105 through a PCI express switch (PCIe-SW) 107, a network interface controller (NIC) 112B, and a network switch (NW-SW) 104. The storage system 105 includes a plurality of storage apparatuses that are managed as a plurality of logical units (LUs). Further, the server 102 is connected to the storage system 105 through a host bus adaptor 115 and a fibre channel switch (FC-SW) 108 as well. Additionally, the storage system 105 is directly connected to the management server 101 through the FC-SW 108 or the NW-SW 104.

The management server 101 includes a control program 110 and a management table group 111. A detailed configuration, for example, of the control program 110 will be described later.

The monitoring target system 100, the management server 101, the operator terminal 170, and the senior manager terminal 180, which configure the event monitoring apparatus, are information processing apparatuses capable of performing various information processes.

Figure 2:
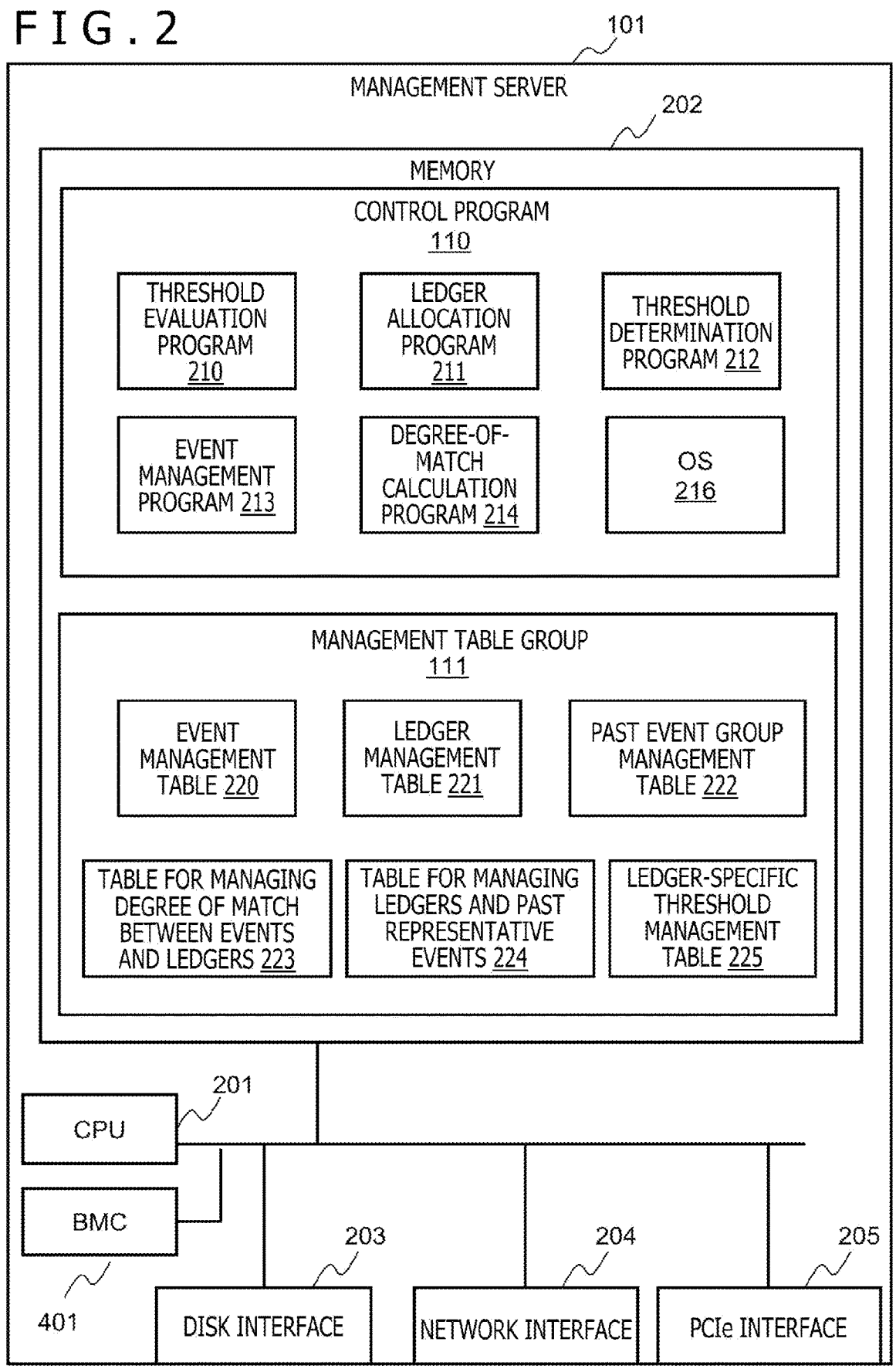
FIG. 2 is a schematic diagram illustrating a configuration of a management server configured as an event monitoring apparatus according to an embodiment of the present invention.

FIG. 2 is a schematic diagram illustrating a configuration of the management server 101, which is configured as the event monitoring apparatus according to an embodiment of the present invention.

The management server 101 includes a CPU 201, a memory 202, a disk interface 203, a network interface 204, a PCI express interface 205, and a baseboard management controller (BMC) 401. The CPU 201 is an example of a processor. The baseboard management controller (BMC) 401 is an example of a server management controller.

The memory 202 stores control programs 110 such as firmware. When the management server 101 starts running (e.g., upon power turn-on), the firmware and other control programs are read from the memory 202 and executed to provide overall control of the management server 101. Further, the memory 202 stores the management table group 111 in addition to the control programs. The management table group 111 is required for various processes of the management server 101.

As the control programs 110, the memory 202 stores a threshold evaluation program 210, a ledger allocation program 211, a threshold determination program 212, an event management program 213, a degree-of-match calculation program 214, and an operating system (OS) 216. When the OS 216 is executed by the CPU 201, the various control programs other than the OS 216 implement functional sections corresponding to the individual control programs. Functions exercised by the functional sections corresponding to the individual control programs will be described in detail later.

Furthermore, as the management table group 111, the memory 202 stores an event management table 220, a ledger management table 221, a past event group management table 222, a table 223 for managing the degree of match between events and ledgers, a table 224 for managing ledgers and past representative events, and a ledger-specific threshold management table 225. Configurations of the various above-mentioned tables will be described in detail later.

Figure 3:
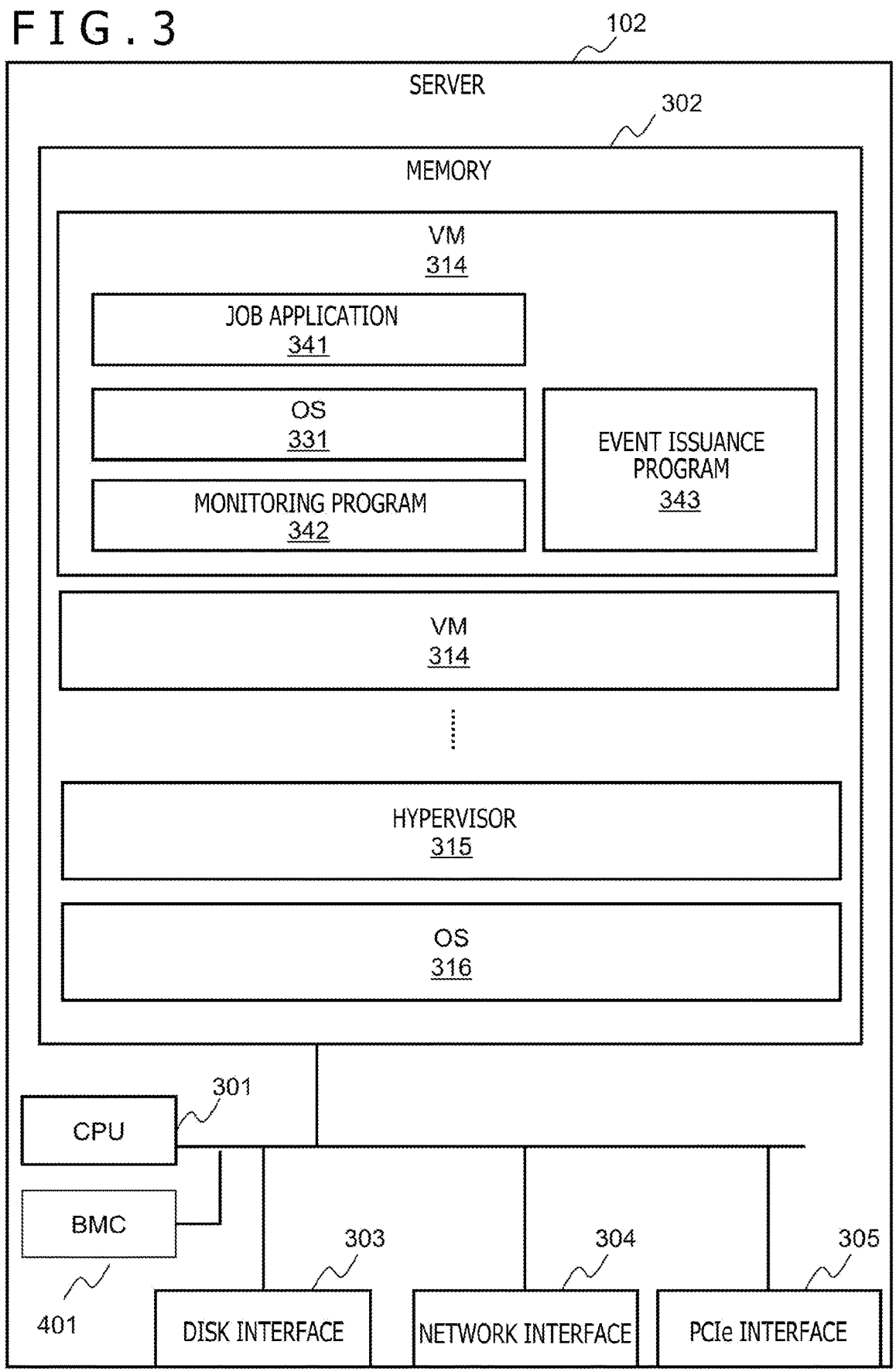
FIG. 3 is a schematic diagram illustrating a configuration of a server of the event monitoring system according to an embodiment of the present invention.

FIG. 3 is a schematic diagram illustrating a configuration of the server 102 of the event monitoring system according to an embodiment of the present invention.

The server 102 includes a CPU 301, a memory 302, a disk interface 303, a network interface 304, PCI express interface 305, and a baseboard management controller (BMC) 401. The CPU 301 is an example of a processor.

The server 102 according to the present embodiment is configured such that a plurality of virtual machines (VMs) 314 operate. An OS 331 and a job application 341 run on each VM 314. Additionally, a monitoring program 342 and an event issuance program 343 run on each VM 314. The monitoring program 342 monitors the operations of the OS 331 and job application 341. The event issuance program 343 issues an event message on an individual event basis as a result of monitoring conducted by the monitoring program 342. The memory 302 stores the various above-mentioned programs for implementing the VMs 314.

Further, the memory 302 stores a hypervisor 315 and an OS 316. The hypervisor 315 is used to run the virtual machines 314 on the server 102. The OS 316 controls the overall operation of the server 102.

Figure 4:
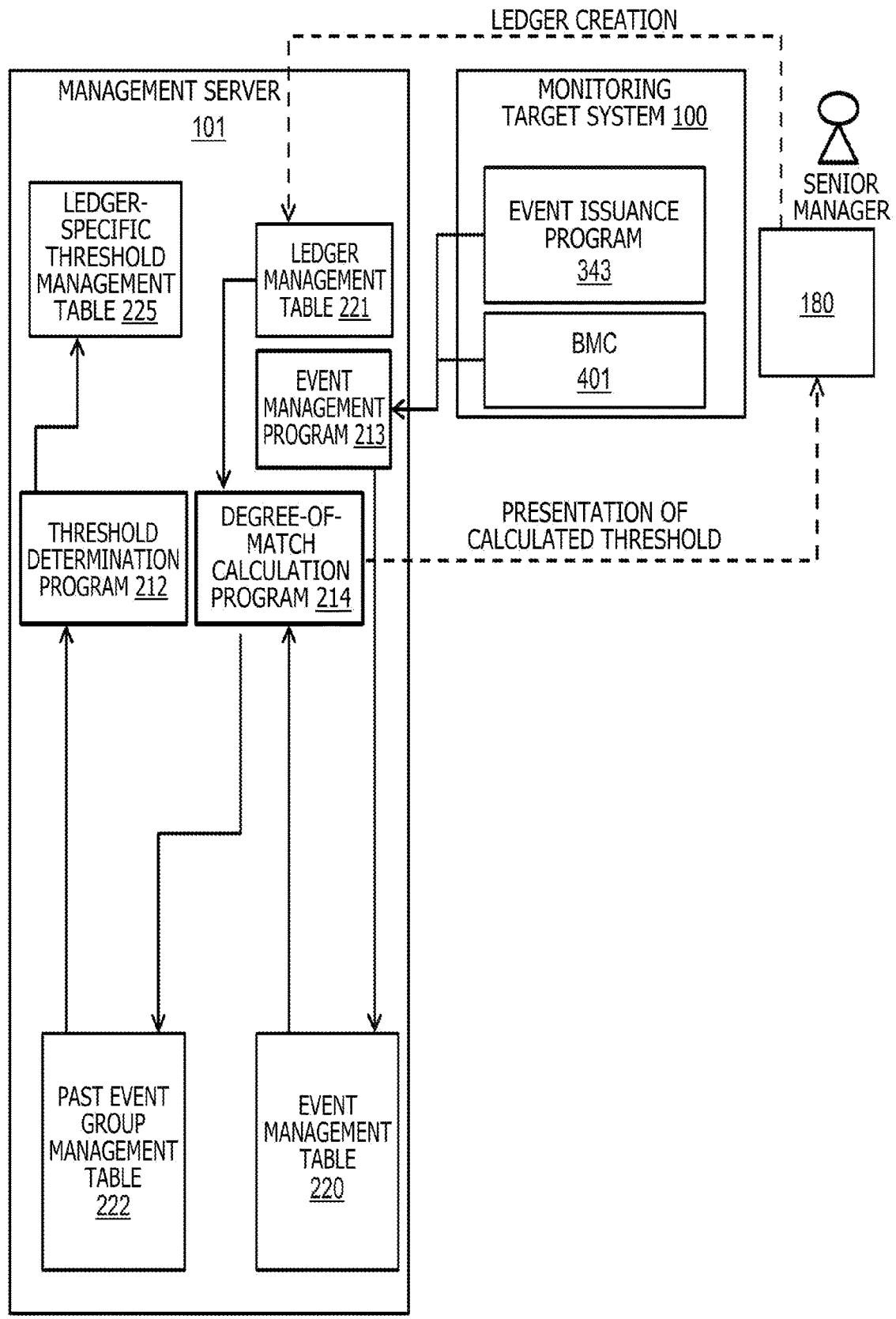
FIG. 4 is a diagram illustrating an example of an operation performed by the event monitoring apparatus according to an embodiment of the present invention.

FIG. 4 is a diagram illustrating an example of an operation performed by the management server 101, which is configured as the event monitoring apparatus according to an embodiment of the present invention. The operation by the management server 101, which is depicted in FIG. 4, is a learning phase operation in which the management server 101 uses a machine learning method to determine a threshold according to a representative event message (hereinafter referred to as the representative message) previously outputted from the monitoring target system 100.

First of all, prior to a monitoring operation performed on the monitoring target system 100 by the management server 101, a senior manager stores the ledger management table 221 through the senior manager terminal 180. Although a configuration of the ledger management table 221 will be described in detail later, a typical ledger guide message that is allocated to an event message outputted from the monitoring target system 100 and should be outputted from the monitoring target system 100 during its normal operation is written in the ledger management table 221. Further, a process to be performed when the typical ledger guide message is outputted is additionally written in the ledger management table 221. A method of creating the ledger management table 221 is not specifically limited. Under normal conditions, however, the ledger management table 221 is manually created by the senior manager.

When the monitoring target system 100 executes various events, and the event issuance program 343 and the BMC 401 output an event message as needed, the event management program 213 receives the event message and stores the received event message in the event management table 220.

Subsequently, the degree-of-match calculation program 214 references the event management table 220 at a predetermined time point (detailed later), compiles representative events, and stores necessary relevant information in the past event group management table 222. The threshold determination program 212 references the past event group management table 222 and the ledger management table 221, and determines the threshold by performing a later-described procedure. The threshold determined by the threshold determination program 212 is stored in the ledger-specific threshold management table 225. Further, the threshold determination program 212 presents the determined threshold to the senior manager terminal 180.

Figure 5:
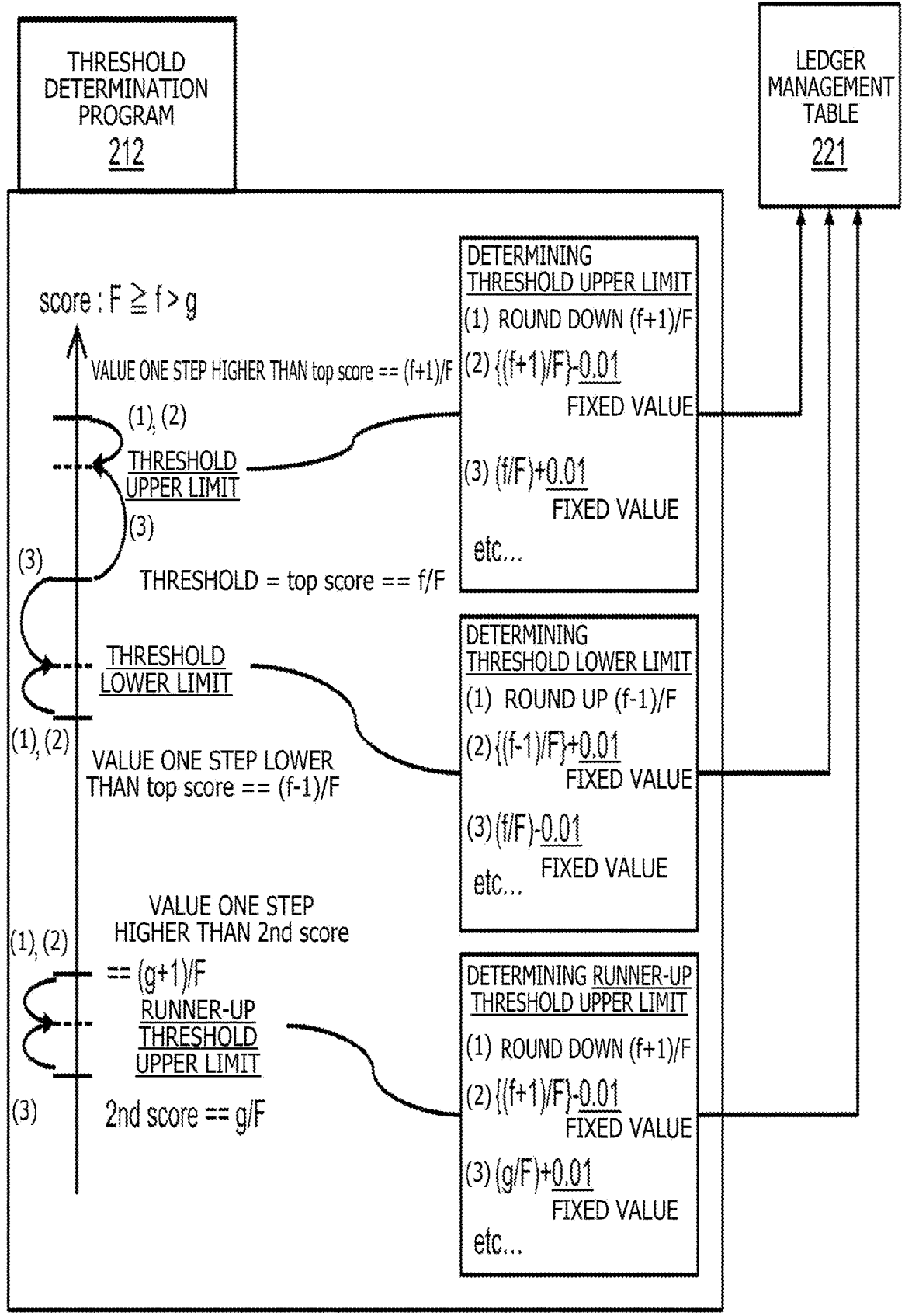
FIG. 5 is a diagram illustrating a threshold determination procedure performed by the event monitoring apparatus according to an embodiment of the present invention.

FIG. 5 is a diagram illustrating a threshold determination procedure performed by the management server 101, which is configured as the event monitoring apparatus according to an embodiment of the present invention.

First of all, the threshold determination program 212 divides, into individual words, an event message and a representative message that are stored in the ledger management table 221 and the past event group management table 222. A method of dividing into individual words is not specifically limited. However, for example, a morphological analysis program, such as MeCab, should preferably be used.

For example, as regards a message "backup process func A_Func B is starting. XXX YYYY ZZ," the threshold determination program 212 outputs a word-by-word morphological analysis result {backup, process, func, A, _, Func, B, is, starting, XXX, YYYY, ZZ} (words are assumed to be separated by a comma).

Next, the threshold determination program 212 generates, by N-gram, a set of words (word sequences) in accordance with the outputted word-by-word morphological analysis result. When the above message is cited as an example, the generated word sequences are {backup}, {process}, {func}, {A}, {_}, {Func}, {B}, {is}, {starting}, {XXX}, {YYYY}, {ZZ} in the case of 1-gram, {backup,process}, {process,func}, {func,A}, {A,_}, {_,Func}, {Func,B} {B,is}, {is,starting}, {starting,XXX}, {XXX,YYYY}, {YYYY,ZZ} in the case of 2-gram, or [{backup}, {process}, {func}, {A}, {_}, {Func}, {B}, {is}, {starting}, {XXX}, {YYYY}, {ZZ}, {backup,process}, {process,func}, {func,A}, {A,_}, {_,Func}, {Func,B} {B,is}, {is,starting}, {starting,XXX}, {XXX,YYYY}, {YYYY,ZZ}] when created by a set of 1-gram and 2-gram (here, character strings enclosed by braces { } are word sequences). Any number of words may be used to generate the word sequences. The number of words used for word sequence generation is not limited to the above example.

Next, the threshold determination program 212 performs calculations to determine the following numbers according to ledger guide message word sequences in the ledger management table 221 and representative message word sequences stored in the past event group management table 222.

F: The total number of message body word sequences in the ledger management table 221.

f: The largest number of representative message body word sequences included in a representative event and identical with message body word sequences in the ledger management table 221 (top).

g: The second largest number of representative message body word sequences included in a representative event and identical with message body word sequences in the ledger management table 221 (runner-up).

The number of representative message body word sequences included in a representative event and identical with message body word sequences in the ledger management table 221 may be hereinafter referred to as the degree of similarity.

The threshold determination program 212 determines the value f/F, that is, the maximum degree of similarity (indicated as a "top score" in FIG. 5), as a threshold (first threshold). The threshold determination program 212 then determines a threshold upper limit (second threshold) higher than the determined threshold, a threshold lower limit (third threshold) lower than the determined threshold, and a runner-up threshold upper limit (fourth threshold) lower than the threshold lower limit.

First of all, the threshold determination program 212 calculates (f+1)/F, which is a value one step higher than the top score, rounds the value of (f+1)/F (this value is 1 or smaller because F≥f>g) down to a predetermined number of decimal places, and regards the obtained value as the threshold upper limit (marked (1) in FIG. 5). Alternatively, the threshold determination program 212 subtracts a predetermined fixed value (0.01 in the example of FIG. 5) from the absolute value of (f+1)/F (enclosed by braces { } in FIG. 5), and regards the obtained value as the threshold upper limit (marked (2) in FIG. 5). Further, the threshold determination program 212 adds a predetermined fixed value (0.01 in the example of FIG. 5) to the absolute value of f/F, and regards the obtained value as the threshold upper limit (marked (3) in FIG. 5). The threshold upper limit may be any value greater than the threshold, and reselected or adjusted as needed to let the management server 101 perform a smooth monitoring operation.

Furthermore, threshold determination program 212 calculates (f−1)/F, which is a value one step lower than the top score, rounds the calculated value of (f−1)/F (this value is also 1 or smaller because F≥f>g) up to a predetermined number of decimal places, and regards the obtained value as the threshold lower limit (marked (1) in FIG. 5). Alternatively, the threshold determination program 212 adds a predetermined fixed value (0.01 in the example of FIG. 5) to the absolute value of (f−1)/F (enclosed by braces { } in FIG. 5), and regards the obtained value as the threshold lower limit (marked (2) in FIG. 5). Further, the threshold determination program 212 subtracts a predetermined fixed value (0.01 in the example of FIG. 5) from the absolute value of f/F, and regards the obtained value as the threshold lower limit (marked (3) in FIG. 5). The threshold lower limit may similarly be any value smaller than the threshold, and reselected or adjusted as needed to let the management server 101 perform a smooth monitoring operation.

Subsequently, the threshold determination program 212 calculates (g+1)/F, which is a value one step higher than a runner-up degree of similarity (indicated as a "second score" in FIG. 5), rounds the calculated value of (g+1)/F (this value is also 1 or smaller because F≥f>g) down to a predetermined number of decimal places, and regards the obtained value as the runner-up threshold upper limit (marked (1) in FIG. 5). Alternatively, the threshold determination program 212 subtracts a predetermined fixed value (0.01 in the example of FIG. 5) from the absolute value of (g+1)/F (enclosed by braces { } in FIG. 5), and regards the obtained value as the runner-up threshold upper limit (marked (2) in FIG. 5). Further, the threshold determination program 212 adds a predetermined fixed value (0.01 in the example of FIG. 5) to the absolute value of g/F, and regards the obtained value as the runner-up threshold upper limit (marked (3) in FIG. 5). The runner-up threshold upper limit may similarly be any value smaller than the threshold lower limit, and reselected or adjusted as needed to let the management server 101 perform a smooth monitoring operation.

The reason why the threshold upper limit, the threshold lower limit, and the runner-up threshold upper limit are defined as described above will now be briefly explained. General event monitoring apparatuses calculate the degree of similarity between a ledger guide message stored in the ledger management table 221 and an event message to be outputted from the monitoring target system 100. When, for example, an outputted event message has the degree of similarity equal to or higher than the threshold in the present embodiment, the common event monitoring apparatuses allocate the ledger guide message, and confirm that the monitoring target system 100 is operating normally.

However, the results of analysis made by the inventors of the present invention have indicated that event messages having the degree of similarity equal to or higher than the threshold might include events not stored in the ledger management table 221, namely, events not known (hereinafter may be referred to as unknown events), and that event messages having the degree of similarity lower than the threshold might include ignorable events and messages related to the above-mentioned unknown events.

In view of the above circumstances, the inventors of the present invention have devised a configuration in which event messages having the degree of similarity intermediate between the threshold upper limit and the threshold lower limit are concluded that the event messages are related to normal events and ledger guide messages are allocated, and event messages having the degree of similarity higher than the threshold upper limit or intermediate between the threshold lower limit and the runner-up threshold upper limit are concluded that the event messages are related to unknown events, and the result of conclusion is reported to the senior manager.

In the above instance, the threshold determination program 212 does not need to determine all of the threshold upper limit, threshold lower limit, and runner-up threshold upper limit, or the later-described threshold evaluation program 210 does not need to make determination based on all of the threshold upper limit, threshold lower limit, and runner-up threshold upper limit. Determination should be made at least by checking whether the degree of similarity is either (a) higher than the threshold upper limit or (b) intermediate between the threshold lower limit and the runner-up threshold upper limit.

Further, the reason why the threshold upper limit and the threshold lower limit are defined is that a determination made based only on the threshold might slightly vary the degree of similarity. A certain range is defined by the threshold upper limit and the threshold lower limit in order to increase the accuracy of determination.

Figure 6:
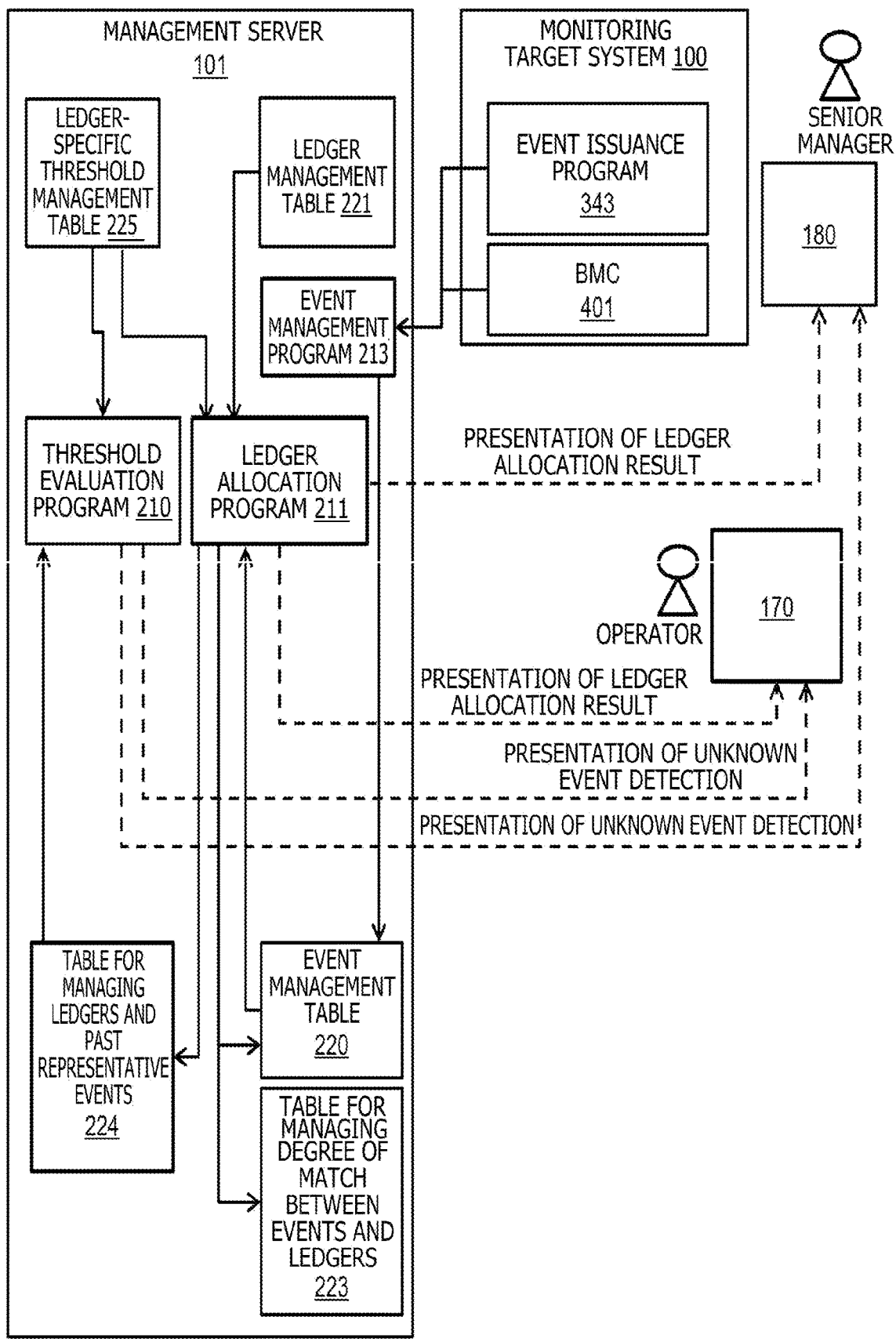
FIG. 6 is a diagram illustrating another example of the operation performed by the event monitoring apparatus according to an embodiment of the present invention.

FIG. 6 is a diagram illustrating another example of the operation performed by the event monitoring apparatus according to an embodiment of the present invention. The operation by the management server 101, which is depicted in FIG. 6, is an inference phase operation that is performed according to event messages outputted from the monitoring target system 100 after a threshold determination operation in a learning phase depicted in FIG. 4 in order to allocate to the ledger management table 221 and detect unknown events.

When various events are executed in the monitoring target system 100 to let the event issuance program 343 and the BMC 401 output an event message as needed, the event management program 213 receives the event message and stores the received event message in the event management table 220.

Next, the ledger allocation program 211 calculates the degree of similarity (degree of match) between a new event message stored in the event management table 220 and a ledger guide message stored in the ledger management table 221, and stores the calculated degree of similarity (degree of match) in the table 223 for managing the degree of match between events and ledgers.

Based on the degree of similarity calculated by the ledger allocation program 211 and on the threshold, threshold upper limit, threshold lower limit, and runner-up threshold upper limit stored in the ledger-specific threshold management table 225, the threshold evaluation program 210 determines whether the degree of similarity is higher than the threshold upper limit, and determines whether the degree of similarity is intermediate between the threshold lower limit and the runner-up threshold upper limit. If either of the above determinations is affirmed, the threshold evaluation program 210 presents information indicative of unknown event detection to an operator (operator terminal 170) for the purpose of prompting the operator to formulate a judgement.

Meanwhile, if the above determinations are denied, that is, when the degree of similarity is determined to be intermediate between the threshold upper limit and the threshold lower limit, the ledger allocation program 211 allocates a ledger guide message having the maximum degree of similarity, and presents the result of such allocation to the operator terminal 170 and the senior manager (senior manager terminal 180). Further, when the degree of similarity is determined to be lower than the runner-up threshold upper limit, the ledger allocation program 211 does not perform any particular presentation operation (discards the event message).

FIG. 7 is a diagram illustrating an example of the event management table 220 stored in the memory 202 of the event monitoring apparatus according to an embodiment of the present invention.

Entries included in the event management table 220 are a phenomenon ID 701, an occurrence date and time 702, a hash value 703, an event ID 704, a message body 705, an allocated ledger ID 706, and the total number of event word sequences 707.

The phenomenon ID 701 is an ID for identifying each row of the event management table 220. The occurrence date and time 702 indicates the occurrence date and time of an event. The hash value 703 is a hash value of an event message, and is calculated by the event management program 213. The event ID 704 is an ID for identifying an event. The message body 705 is the body of an event message outputted from the monitoring target system 100. The allocated ledger ID 706 is the ID of a ledger guide message to which an event message written in the message body 705 is allocated, and is inputted by the ledger allocation program 211. The total number of event word sequences 707 is the total number of word sequences in an event message written in the message body 705, and is calculated by the event management program 213.

FIG. 8 is a diagram illustrating an example of the past event group management table 222 stored in the memory 202 of the event monitoring apparatus according to an embodiment of the present invention.

Each entry in the past event group management table 222 depicted in FIG. 8 is calculated by the degree-of-match calculation program 214. More specifically, the degree-of-match calculation program 214 compares the word sequences of a certain past event with those of the other past events, and groups the one having the highest degree of match as a representative event message. Then, the degree-of-match calculation program 214 sorts the contents of the past event group management table 222 by the degree of match. Each entry in the past event group management table 222 may be calculated at any time point to create the past event group management table 222. For example, the calculation may be performed upon each arrival of a new event, on a periodic basis, or at a time point when a predetermined number of events have arrived.

The entries included in the past event group management table 222 are a group ID 801, a representative message body 802, a degree of match 803, the total number of word sequences in the representative message body 804, and the number of grouped events 805.

The group ID 801 is an ID for identifying a group. The representative message body 802 is the body of a representative event message representing the group. The degree of match 803 is the degree of match of the representative event message. The total number of word sequences in the representative message body 804 is the total number of word sequences in the body of the representative event message stored in the representative message body 802. The number of grouped events 805 indicates the number of events included in the group.

The past event group management table 222 contains training data for machine learning conducted by the threshold determination program 212, and serves as a basis when the senior manager determines whether an event message arriving from the monitoring target system 100 is proper.

FIG. 9 is a diagram illustrating an example of the ledger management table 221 of the event monitoring apparatus according to an embodiment of the present invention. As mentioned earlier, it is assumed that, for example, the senior manager manually inputs information into the ledger management table 221.

Entries included in the ledger management table 221 are a ledger ID 901, a designated occurrence date and time 902, a ledger message body 903, a process performed upon arrival 904, and the number of times per unit period 905.

The ledger ID 901 is an ID for identifying a ledger message body (ledger guide message) 903. The designated occurrence date and time 902 is the date and time when the ledger message body 903 is usually outputted from the monitoring target system 100. The ledger message body 903 is a ledger guide message that should be outputted from the monitoring target system 100. The process performed upon arrival 904 is a process that should be performed when the ledger message body 903 is outputted from the monitoring target system 100. The number of times per unit period 905 is a frequency with which the ledger message body 903 is outputted from the monitoring target system 100.

FIG. 10 is a diagram illustrating an example of the table 223 for managing the degree of match between events and ledgers of the event monitoring apparatus according to an embodiment of the present invention.

Entries included in the table 223 for managing the degree of match between events and ledgers are a management ID 1001, a phenomenon ID 1002, a message body 1003, the total number of word sequences 1004, a match rate 1005, a match count 1006, an unmatch/insufficiency rate 1007, an unmatch/insufficiency count 1008, a ledger ID 1009, a message body 1010, the total number of word sequences 1011, a match rate 1012, a match count 1013, an unmatch/insufficiency rate 1014, and an unmatch/insufficiency count 1015.

The management ID 1001 is an ID for identifying each row of the table 223 for managing the degree of match between events and ledgers.

The phenomenon ID 1002, the message body 1003, the total number of word sequences 1004, the match rate 1005, the match count 1006, the unmatch/insufficiency rate 1007, and the unmatch/insufficiency count 1008 are the entries related to events. The phenomenon ID 1002 and the phenomenon ID 701 of the event management table 220 depicted in FIG. 7 are common to each other. The message body 1003 and the message body 705 of the event management table 220 depicted in FIG. 7 are common to each other. The total number of word sequences 1004 and the total number of event word sequences 707 of the event management table 220 depicted in FIG. 7 are common to each other.

The match rate 1005 is the percentage at which event messages written in the message body 1003 are found in both events and ledgers. The match count 1006 is the number of event messages written in the message body 1003 that are found in both the events and the ledgers. The unmatch/insufficiency rate 1007 is the percentage at which event messages written in the message body 1003 are found in the events but not found in the ledgers. The unmatch/insufficiency count 1008 is the number of event messages written in the message body 1003 that are found in the events but not found in the ledgers. The denominators of the match rate 1005, match count 1006, unmatch/insufficiency rate 1007, and unmatch/insufficiency count 1008 are the number of events.

The ledger ID 1009, the message body 1010, the total number of word sequences 1011, the match rate 1012, the match count 1013, the unmatch/insufficiency rate 1014, and the unmatch/insufficiency count 1015 are the entries related to ledger guide messages. The ledger ID 1009 and the ledger ID 901 of the ledger management table 221 depicted in FIG. 9 are common to each other. The message body 1010 and the ledger message body 903 of the ledger management table 221 depicted in FIG. 9 are common to each other. The total number of word sequences 1011 is the total number of ledger guide message word sequences written in the message body 1010.

The match rate 1012 is the percentage at which event messages written in the message body 1010 are found in both events and ledgers. The match count 1013 is the number of event messages written in the message body 1010 that are found in both the events and the ledgers. The unmatch/insufficiency rate 1014 is the percentage at which event messages written in the message body 1010 are found in the events but not found in the ledgers. The unmatch/insufficiency count 1015 is the number of event messages written in the message body 1010 that are found in the events but not found in the ledgers. The denominators of the match rate 1012, match count 1013, unmatch/insufficiency rate 1014, and unmatch/insufficiency count 1015 are the number of ledgers.

FIG. 11 is a diagram illustrating an example of the table 224 for managing the ledgers and past representative events of the event monitoring apparatus according to an embodiment of the present invention.

Entries included in the table 224 for managing the ledgers and the past representative events are a ledger ID 1101, a message body 1102, the total number of word sequences 1103, a match rate 1104, a match count 1105, an unmatch/insufficiency rate 1106, an unmatch/insufficiency count 1107, the total number of word sequences 1108, a match rate 1109, a match count 1110, an unmatch/insufficiency rate 1111, and an unmatch/insufficiency count 1112.

The ledger ID 1101, the message body 1102, the total number of word sequences 1103, the match rate 1104, the match count 1105, the unmatch/insufficiency rate 1106, and the unmatch/insufficiency count 1107 are the entries related to ledger guide messages. The ledger ID 1101 and the ledger ID 901 of the ledger management table 221 depicted in FIG. 9 are common to each other. The message body 1102 and the ledger message body 903 of the ledger management table 221 depicted in FIG. 9 are common to each other. The total number of word sequences 1103 and the total number of word sequences 1011 of the table 223 for managing the degree of match between events and ledgers, which is depicted in FIG. 10, are common to each other.

The match rate 1104 is the percentage at which ledger guide messages written in the message body 1102 are found in both ledgers and representative events. The match count 1105 is the number of ledger guide messages written in the message body 1102 that are found in both the ledgers and the representative events. The unmatch/insufficiency rate 1106 is the percentage at which ledger guide messages written in the message body 1102 are found in the ledgers but not found in the representative events. The unmatch/insufficiency count 1107 is the number of ledger guide messages written in the message body 1102 that are found in the ledgers but not found in the representative events. The denominators of the match rate 1104, match count 1105, unmatch/insufficiency rate 1106, and unmatch/insufficiency count 1107 are the number of ledgers.

The total number of word sequences 1108, the match rate 1109, the match count 1110, the unmatch/insufficiency rate 1111, and the unmatch/insufficiency count 1112 are the entries related to representative events. The total number of word sequences 1108 and the total number of word sequences in the representative message body 804 of the past event group management table 222 are common to each other.

The match rate 1109 is the percentage at which representative events are found in both ledgers and representative events. The match count 1110 is the number of representative events found in both the ledgers and the representative events. The unmatch/insufficiency rate 1111 is the percentage at which no representative events are found in the ledgers. The unmatch/insufficiency count 1112 is the number of representative events that are not found in the ledgers. The denominators of the match rate 1109, match count 1110, unmatch/insufficiency rate 1111, and unmatch/insufficiency count 1112 are the number of representative events.

FIG. 12 is a diagram illustrating an example of the ledger-specific threshold management table 225 of the event monitoring apparatus according to an embodiment of the present invention.

Entries included in the ledger-specific threshold management table 225 are a ledger ID 1201, a message body 1202, the number of times per unit period 1203, a past event representative message body 1204, the number of grouped events 1205, a group ID 1206, a threshold 1207, a threshold upper limit 1208, a threshold lower limit 1209, a runner-up threshold upper limit 1210, the total number of ledger word sequences 1211, and an allocated phenomenon ID 1212.

The ledger ID 1201 and the ledger ID 901 of the ledger management table 221 depicted in FIG. 9 are common to each other. The message body 1202 and the ledger message body 903 of the ledger management table 221 depicted in FIG. 9 are common to each other. The number of times per unit period 1203 and the number of times per unit period 905 of the ledger management table 221 depicted in FIG. 9 are common to each other.

The past event representative message body 1204 and the representative message body 802 of the past event group management table 222 depicted in FIG. 8 are common to each other. The number of grouped events 1205 and the number of grouped events 805 of the past event group management table 222 depicted in FIG. 8 are common to each other. The group ID 1206 and the group ID 801 of the past event group management table 222 depicted in FIG. 8 are common to each other.

The threshold 1207, the threshold upper limit 1208, the threshold lower limit 1209, and the runner-up threshold upper limit 1210 are calculated in the learning phase by the threshold determination program 212 and stored. The total number of ledger word sequences 1211 is the total number of ledger guide message word sequences identified by the ledger ID 1201. The allocated phenomenon ID 1212 is the phenomenon ID of an event that is allocated in the inference phase by the ledger allocation program 211. The allocated phenomenon ID 1212 and the phenomenon ID 701 of the event management table 220 depicted in FIG. 7 are common to each other.

Operations of the management server 101, which is configured as the event monitoring apparatus according to the present embodiment, will now be described with reference to the flowcharts of FIGS. 13 to 16.

Figure 13:
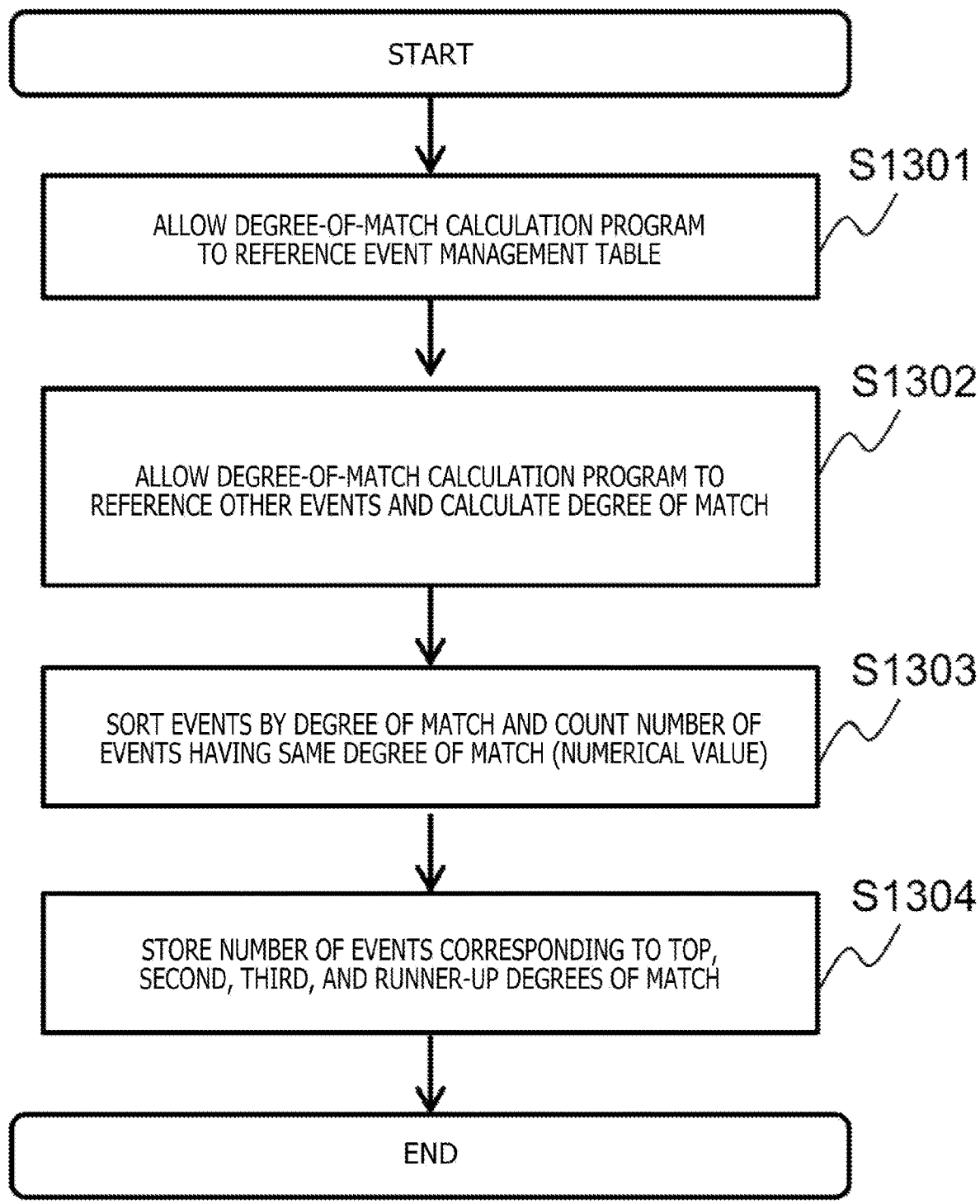
FIG. 13 is a flowchart illustrating an example of a procedure for creating the past event group management table of the event monitoring apparatus according to an embodiment of the present invention.

FIG. 13 is a flowchart illustrating an example of a procedure that is performed by the degree-of-match calculation program 214 for creating the past event group management table 222 of the event monitoring apparatus according to an embodiment of the present invention.

First of all, the degree-of-match calculation program 214 references a specific event in the event management table 220 (step S1301). Next, the degree-of-match calculation program 214 references events other than the specific event in the event management table 220, and calculates the degree of similarity (degree of match) (step S1302). Further, the degree-of-match calculation program 214 sorts the events by the degree of similarity calculated in step S1302, and counts the number of events having the same degree of similarity (step S1303). Subsequently, the degree-of-match calculation program 214 stores various values in the entries of the past event group management table 222, the various values including the number of events corresponding to the top degree, second degree, and runner-up degree of similarity.

Figure 14:
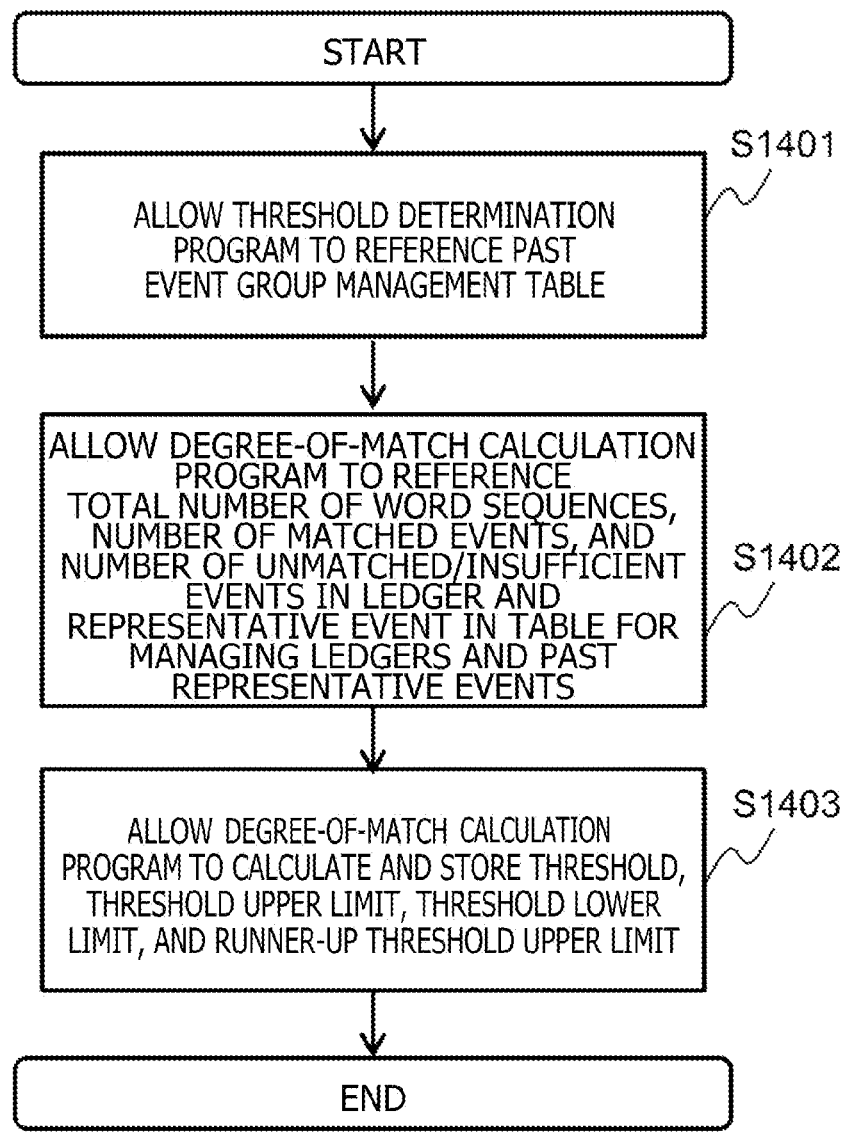
FIG. 14 is a flowchart illustrating an example of the threshold determination procedure performed by the event monitoring apparatus according to an embodiment of the present invention.

FIG. 14 is a flowchart illustrating an example of the threshold determination procedure performed by the event monitoring apparatus according to an embodiment of the present invention. More specifically, the flowchart describes a procedure for storing various values in the ledger-specific threshold management table 225.

First of all, the threshold determination program 212 references the past event group management table 222 (step S1401). Next, the degree-of-match calculation program 214 references the total number of word sequences, the number of matched events, and the number of unmatched/insufficient events in the ledger and the representative event in the table 224 for managing the ledgers and the past representative events (step S1402). Next, the degree-of-match calculation program 214 calculates the threshold, the threshold upper limit, the threshold lower limit, and the runner-up threshold upper limit, and stores the calculated values in the ledger-specific threshold management table 225 (step S1403).

Figure 15:
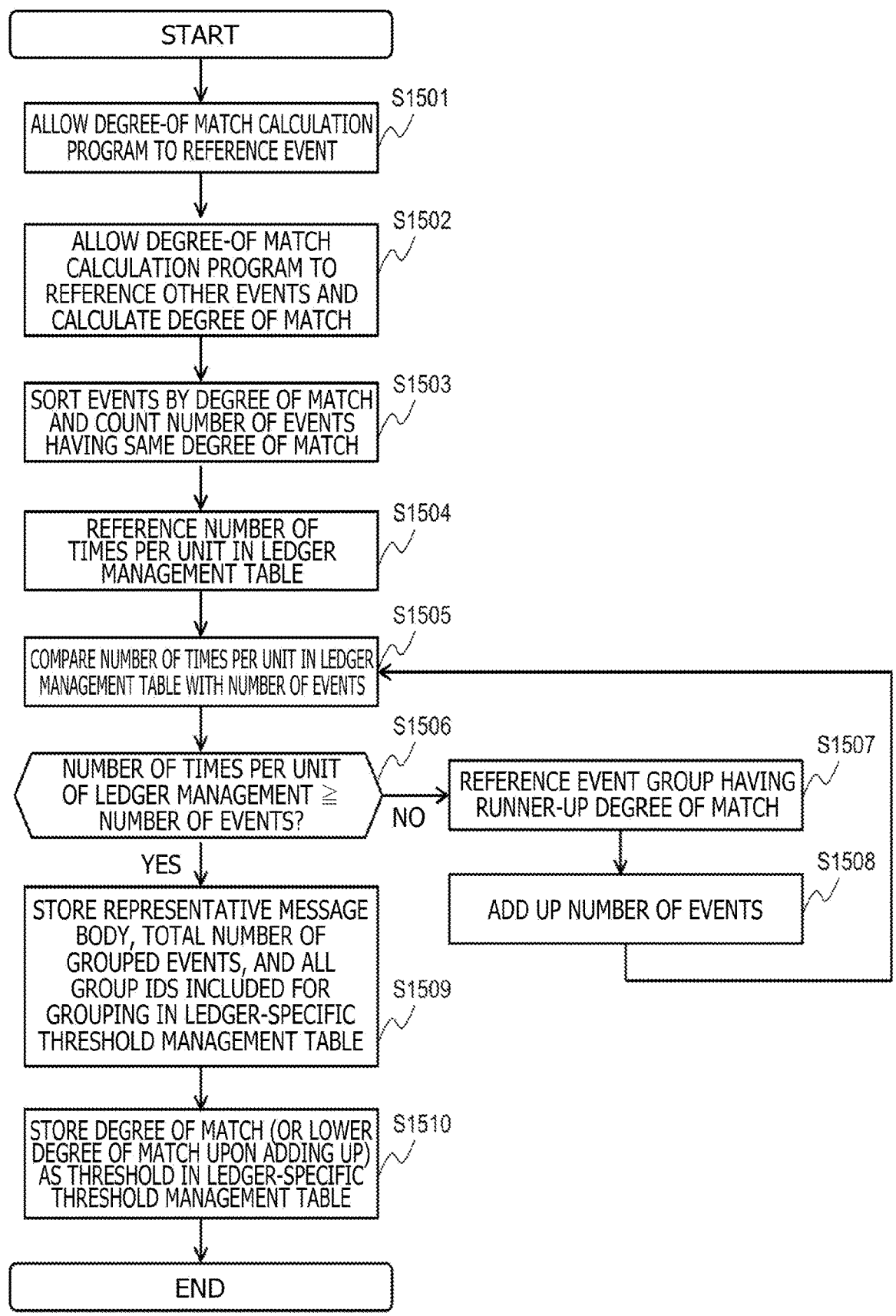
FIG. 15 is a flowchart illustrating an example of a procedure for replenishing the ledger management table of the event monitoring apparatus according to an embodiment of the present invention.

FIG. 15 is a flowchart illustrating an example of a procedure for replenishing the ledger management table 221 of the event monitoring apparatus according to an embodiment of the present invention. The procedure described in the flowchart of FIG. 15 is used to perform a process of including the number of representative event messages having the runner-up degree of match (second score) in a case where the ledger guide messages stored in the ledger management table 221 and the representative event messages stored in the past event group management table 222, particularly, the representative event messages having a high degree of match (top score) in the past event group management table 222 are insufficient in number depending, for example, on the monitoring target system 100. Consequently, the process described in the flowchart of FIG. 15 is not essential to the operations of the management server 101 configured as the event monitoring apparatus according to the present embodiment.

First of all, the degree-of-match calculation program 214 references a specific event in the event management table 220 (step S1501). Next, the degree-of-match calculation program 214 references events other than the specific event in the event management table 220, and calculates the degree of similarity (degree of match) (step S1502). Further, the degree-of-match calculation program 214 sorts the events by the degree of similarity calculated in step S1302, and counts the number of events having the same degree of similarity (step S1503).

Next, the degree-of-match calculation program 214 references the number of times per unit period 905 in the ledger management table 221 (step S1504). Then, the degree-of-match calculation program 214 compares the number of times per unit period 905 referenced in step S1504 with the number of events counted in step S1503 (step S1505). If the result of comparison indicates that the number of times per unit period 905 in the ledger management table 221 is equal to or greater than the number of events ("YES" at step S1506), processing proceeds to step S1509. Meanwhile, if the result of comparison indicates that the number of times per unit period 905 in the ledger management table 221 is smaller than the number of events ("NO" at step S1506), processing proceeds to step S1507.

In step S1507, an event group having the runner-up degree of match is referenced to add up the number of events (step S1508). Subsequently, the program returns to step S1505.

Meanwhile, in step S1509, the degree-of-match calculation program 214 stores the representative message body, the total number of grouped events, and all group IDs included for grouping in the ledger-specific threshold management table 225. Subsequently, the degree-of-match calculation program 214 stores the degree of match (or the lower degree of match upon adding up), as the threshold, in the ledger-specific threshold management table 225.

Figure 16:
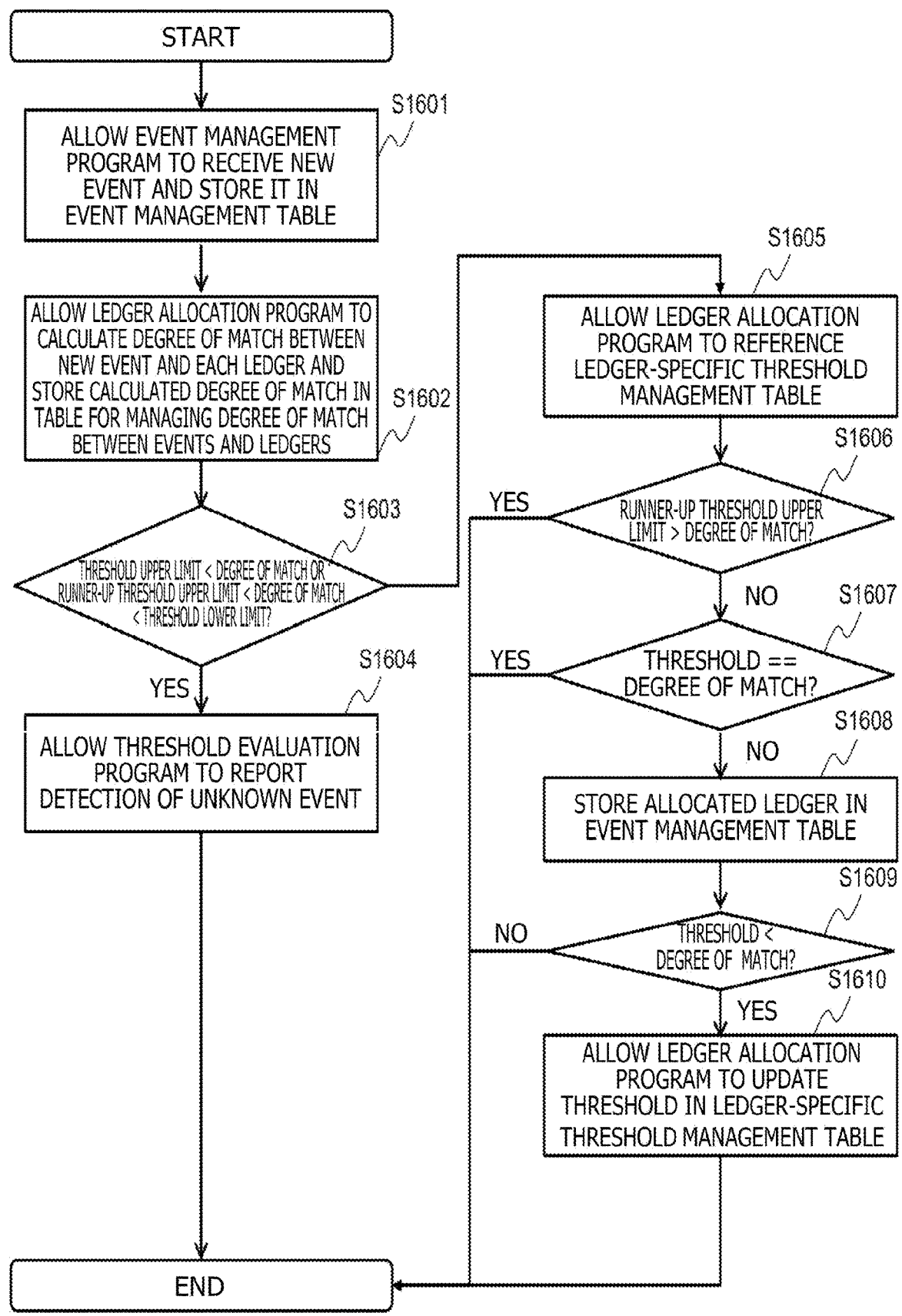
FIG. 16 is a flowchart illustrating the operations of a ledger allocation section and threshold evaluation section of the event monitoring apparatus according to an embodiment of the present invention.

FIG. 16 is a flowchart illustrating the operations of the ledger allocation program 211 and threshold evaluation program 210 of the event monitoring apparatus in the inference phase according to an embodiment of the present invention.

First of all, the event management program 213 receives a new event from the monitoring target system 100, and stores the new event in the event management table 220 (step S1601). Then, the ledger allocation program 211 calculates the degree of match between the new event and each ledger, and stores the calculated degree of match in the table 223 for managing the degree of match between events and ledgers (step S1602).

Next, the threshold evaluation program 210 determines whether the degree of match (degree of similarity) calculated in step S1602 is higher than the threshold upper or intermediate between the threshold lower limit and the runner-up threshold upper limit (step S1603). If, as a result, the above determination is affirmed ("YES" at step S1603), processing proceeds to step S1604. Meanwhile, if the above determination is denied ("NO" at step S1603), processing proceeds to step S1605.

In step S1604, the threshold evaluation program 210 reports the detection of an unknown event to the operator terminal 170 and the senior manager terminal 180.

Meanwhile, in step S1605, the ledger allocation program 211 references the ledger-specific threshold management table 225. The ledger allocation program 211 then determines whether the degree of match calculated in step S1602 is lower than the runner-up threshold upper limit (step S1606). If the determination is affirmed ("YES" at step S1606), the program terminates. Meanwhile, if the determination is denied ("NO" at step S1606), processing proceeds to step S1607. Subsequently, in step S1607, the ledger allocation program 211 determines whether the degree of match calculated in step S1602 is equal to the threshold. If the determination is affirmed ("YES" at step S1607), the program terminates. Meanwhile, if the determination is denied ("NO" at step S1607), processing proceeds to step S1608.

In step S1608, the ledger allocation program 211 stores an allocated ledger in the event management table 220.

Further, the ledger allocation program 211 determines whether the degree of match calculated in step S1602 is lower than the threshold (step S1609). If the determination is affirmed ("YES" at step S1609), processing proceeds to step S1610. Meanwhile, if the determination is defined ("NO" at step S1609), the program terminates.

In step S1610, the ledger allocation program 211 updates the threshold in the ledger-specific threshold management table 225.

It should be noted that the detection of an unknown event in step S1604 may be used as a trigger for performing the learning phase operation again (performing relearning).

FIG. 17 is a diagram illustrating an example of a screen that is displayed, for example, on the operator terminal 170 of the event monitoring system according to an embodiment of the present invention.

Displayed on the screen, for example, of the operator terminal 170 are a phenomenon ID 1701, an event ID 1702, whether an allocation is done 1703, whether an unknown event is detected 1704, an event occurrence date and time 1705, and an allocated ledger ID 1706. The screen depicted in FIG. 17 is merely an example. The screen is not limited to the one depicted in the example of FIG. 17.

The embodiments configured as described above make it possible to implement an event monitoring apparatus and an event monitoring method that are able to properly set a threshold without handling each monitoring target system 100 on an individual basis.

It should be noted that the above description of the embodiments are given in order to explain about a detailed configuration for providing ease of understanding of the present invention. The present invention is not necessarily limited to a configuration that includes all the above-described component elements. Further, some component elements of each embodiment may be subjected to the addition of other component elements, deleted, or replaced by other component elements.

Furthermore, for example, the above-described component elements, functions, processing sections, and processing means may be partly or wholly implemented by hardware, that is, for example, by appropriately designing integrated circuits. Moreover, the embodiments of the present invention may be implemented by program code of software for implementing the functions of the embodiments. In such a case, a storage medium on which the program code is recorded is supplied to a computer, and then a processor incorporated in the computer reads the program code stored on the storage medium. In this case, the program code read from the storage medium implements the functions of the embodiments, and the program code and the storage medium on which the program code is stored are the component elements of the embodiments of the present invention. The storage medium used to supply such program code is, for example, a flexible disk, a compact disc read only memory (CD-ROM), a digital versatile disc read only memory (DVD-ROM), a hard disk, an SSD, an optical disk, a magneto-optical disk, a compact disc-recordable (CD-R), a magnetic tape, a nonvolatile memory card, or a ROM.

Additionally, the program code for providing the functions described in conjunction with the foregoing embodiments may be implemented, for example, by a wide range of programs or script languages such as an assembler, C/C++, perl, Shell, PHP, and Java (registered trademark).

Control lines and information lines considered necessary for explanation are depicted in conjunction with the foregoing embodiments, and all the control lines and information lines required for products are not necessarily depicted. All component elements may be interconnected.

What is claimed is:

1. An event monitoring apparatus that monitors an event including an event message comprising a first character string related to a phenomenon encountered in an information system, the event monitoring apparatus comprising:
   a ledger management data structure that relates each of a plurality of respective stored identifiers of ledgers to a corresponding respective one of a plurality of respective typical ledger guide messages, each comprising a corresponding respective second character string describing a corresponding event;
   a threshold determination processor that calculates degree of morphological similarity between each of the typical ledger guide messages and the event message, sets a maximum value of the calculated degree of morphological similarity as a first threshold, and sets a second threshold that is greater than the first threshold by a predetermined value;
   a ledger allocation processor that associates one of the typical ledger guide messages having a degree of morphological similarity intermediate the first threshold and the second threshold with the event message; and
   a threshold evaluation processor that reports the degree of morphological similarity to the information system when the degree of similarity is higher than the first threshold.

2. The event monitoring apparatus according to claim 1, wherein
   the threshold determination processor calculates the degree of morphological similarity according to degree of match in a word or a set of words generated by an N-gram for each of the corresponding second character strings comprising the typical ledger guide messages and a word or set of words generated by an N-gram of the first character string comprising the event message.

3. The event monitoring apparatus according to claim 2, wherein the threshold determination processor, divides a maximum value of the degree of morphological match in a word or a set of words between each of the second character strings comprising the typical ledger guide messages and the event message by the number of words in the ledger guide message, sets a value obtained from the division as the first threshold, divides a value greater by one than the maximum value by the number of words in each of the typical ledger guide messages, and sets a value obtained from the division as the second threshold.

4. The event monitoring apparatus according to claim 1, further comprising: an event management data structure that stores the event message from the information system.

5. The event monitoring apparatus according to claim 4, further comprising: a degree-of-match calculation processor that selects stored event messages having a high degree of morphological word match from the event messages stored in the event management data structure, and compiles the selected event messages into a representative event message, wherein the threshold determination processor calculates the degree of similarity between the typical ledger guide message and the representative event message.

6. An event monitoring apparatus that monitors an event including an event message comprising a first character string related to a phenomenon encountered in an information system, the event monitoring apparatus comprising:
   a ledger management data structure that a plurality of respective identifiers of stored ledgers to a respective corresponding one of a plurality of typical ledger guide messages, each indicated by a respective corresponding character string describing a corresponding event;
   a threshold determination calculator that calculates degree of morphological similarity between each of the typical ledger guide messages and the event message, regards sets a maximum value of the calculated degree of morphological similarity as a first threshold, sets a third threshold that is smaller than the first threshold by a predetermined value, and sets a fourth threshold that is equal to a second maximum value of the degree of similarity;
   a ledger allocation processor that associates each of the typical ledger guide messages having the degree of morphological similarity intermediate the first threshold and the third threshold with the event message; and
   a threshold evaluation processor that reports the degree of morphological similarity to the information system when the degree of morphological similarity is intermediate the third threshold and the fourth threshold.

7. The event monitoring apparatus according to claim 6, wherein the threshold determination calculator the degree of morphological similarity according to degree of morphological match in a word or a set of words between each of the typical ledger guide messages and the event message.

8. The event monitoring apparatus according to claim 7, wherein
   the threshold determination processor divides a maximum value of the degree of morphological match in a word or a set of words between each of the typical ledger guide messages and the event message by the number of words in each of the typical ledger guide messages, sets a value obtained from the division as the first threshold, divides a value smaller by one than the maximum value by the number of words in each of the typical ledger guide messages, and sets a value obtained from the division as the third threshold.

9. The event monitoring apparatus according to claim 6, further comprising: an event management data structure that stores the event message.

10. The event monitoring apparatus according to claim 9, further comprising:
- a degree-of-match calculation processor that selects event messages having a high degree of morphological word match from the event messages stored in the event management section, and compiles the selected event messages into a representative event message, wherein
- the threshold determination processor calculates the degree of morphological similarity between each of the typical ledger guide messages and the representative event message.

11. An event monitoring method by an event monitoring apparatus that monitors an event including an event message comprising a character string related to a phenomenon encountered in an information system, and includes a ledger management data structure for relating a plurality of of respective ledger identifiers to a respective corresponding typical ledger guide message comprising a character string describing a corresponding event, the event monitoring method comprising:
- calculating degree of morphological similarity between each of the respective corresponding ledger guide messages and the event message, setting a maximum value of the calculated degree of morphological similarity as a first threshold, and setting a second threshold that is greater than the first threshold by a predetermined value;
- associating a typical ledger guide message having the degree of similarity intermediate the first threshold and the second threshold with the event message; and
- reporting the degree of morphological similarity to the information system when the degree of morphological similarity is higher than the first threshold.

* * * * *